Dec. 23, 1969   E. HELLMIG   3,485,626
MULTICOLOR DIFFUSING DIAPHRAGM
Filed Nov. 8, 1965

INVENTOR.
ERHARD HELLMIG

United States Patent Office 3,485,626
Patented Dec. 23, 1969

3,485,626
MULTICOLOR DIFFUSING DIAPHRAGM
Erhard Hellmig, % Agfa-Gevaert Aktiengesellschaft,
Leverkusen, Germany
Filed Nov. 8, 1965, Ser. No. 506,632
Claims priority, application Germany, Dec. 2, 1964,
A 47,758
Int. Cl. G03c 7/04, 5/04, 5/06
U.S. Cl. 96—5  6 Claims

ABSTRACT OF THE DISCLOSURE

Production of unsharp mask images for color correction by a single exposure of a multicolor photographic image illuminated with white light through a diaphragm whose perforations are covered with filters of at least two different colors.

---

Figure 1:
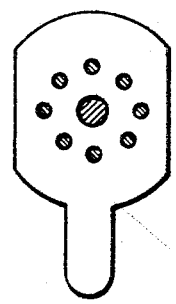

The invention relates to a multicolor diffusing diaphragm consisting of a perforated disc in the perforations of which are inserted filters of at least two different colors, particularly for the production of color correcting masks.

It is well known that in reproduction work, so-called diffusing diaphragms are occasionally used for taking photographic copies. Such diaphragms consist of a thin plate of a material impervious to light such as a metal foil, cardboard, photographic film or the like which is usually blackened to prevent scattering of light and which contains several perforations, usually circular, distributed in a regular arrangement, preferably with central symmetry. Such diffusing diaphragms are also used for the so-called "descreening" in the technique of reproducing copies of screened originals, i.e., originals composed of individual image dots. In these processes, the diffusing diaphragm is inserted directly adjacent to the objective in the path of rays of the camera. It has also been proposed to use such diffusing diaphragms for the production of unsharp masks such as are required in reproduction techniques since the effect of unsharpness can be achieved in a simple manner by this procedure and can even be controlled to a certain extent by the arrangement and form of the perforations in the diffusing diaphragm. It is common practice to produce color correcting masks by so-called double or even multiple exposure. This means that the light-sensitive masking film is first exposed to light of a certain color, i.e., by the use of a certain color filter, and then to light of a second color, i.e., with the use of another color filter. Thus in the case of double exposure it is necessary to carry out two exposures, usually with different exposure times, and to exchange the filters between the two exposures. It is obvious that the operations required for this; namely adjustment of the first exposure time, interposition of the first filter within the path of light, first exposure and adjustment of the second exposure, take up some time and contain sources of error and hence are prejudicial to automation.

It is among the objects of the present invention to obviate the disadvantages of the above methods for the production of color correcting masks, by providing a process by which an unsharp masked image is produced by a single exposure. The above object is attained by applying a multicolor diffusing diaphragm, the perforations of which are covered with the same colored filters which are required for the exposures in a ratio by filter surface area corresponding to the ratio of the exposure times required, in the exposure processes.

The design of the perforation of the multicolor diffusing diaphragm is not critical as regards form, arrangement and number of perforations and can be adapted to the desired unsharpness required for any particular reproduction process. The perforations may be small in number and relatively large or alternatively a very large number of small perforations may be used. The only condition is that the multicolor diffusing diaphragm comprises at least 2 perforations with differently colored filters inserted in the perforations. The perforations need not be of uniform size and shape. The arrangement is preferably regular, in particular with central symmetry, but an asymmetrical arrangement of the perforations is not excluded.

The choice of filters also is not subject to any limitations other than those that have to be observed for the double or multiple exposure with light having different wavelengths. One important case in practice is that in which the filters used are "strict," i.e., they have a narrow spectral range of permeability, as for example, filters which are generally used for the production of color separation records.

One example of a multicolor diffusing diaphragm of central symmetry is illustrated in FIG. 1. The eight small perforations are covered by only one type of filter while the large central perforation is covered with the other type of filter, as indicated by the shading in the two directions. With a diameter of 14 mm. for the large perforation and that of the small perforations 3, 5 mm. each, the surface ratio is $$\left(8\left[\frac{3.5}{2}\right]^2 \cdot \pi\right) : (7^2 \cdot \pi) = 1:2$$

Figure 2:
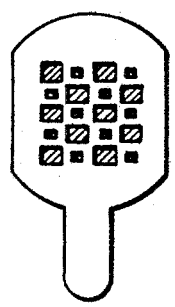

FIGURE 2 illustrates another filter with a regular but not centrally symmetrical arrangement; the surface ratio is the same as in FIGURE 1.

Figure 3:
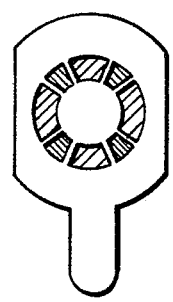

In FIGURE 3, the filter is composed of sectors which vary in size and color, the surface ratio being again the same as in FIGURES 1 and 2.

The multicolor diffusing diaphragm of the present invention is not limited to these examples but is capable of numerous variations. In particular, as already mentioned above, three of even more types of filter may be used instead of only two. It is also possible to leave some of the perforations uncovered or, what amounts to the same thing, to cover some perforations by filters which are completely transparent for visible light. In certain cases, it may be necessary to use neutral grey filters or even filters which transmit only or preferentially rays from the invisible part of the spectrum, especially ultraviolet or infrared rays.

However, a necessary condition in all these cases is that the multicolor diffusing diaphragm according to the invention be used in conjunction with a phtographic material which is sensitive at least to light of those colors that are transmitted by at least two of the types of filters.

It is preferred to use multicolor diffusing diaphragms which contain narrow red and narrow green color filters in approximately the same area distribution.

Example

A mask is produced with the multicolor diffusing diaphragm according to the invention as follows:

A multicolored original reflection copy is placed in known manner into the container provided for it in a reproduction camera and is focused sharply onto the ground glass screen of the camera. One of the known, commercially available panchromatic masking films described below is then placed in complete darkness onto the base of the absorbent surface, with the light-sensitive layer facing this surface.

The multicolor diffusing diaphragm according to the invention is then inserted in the so-called filter slot which is situated on or very close to the objective. The diaphragm has the form shown in FIGURE 1 and the axially situated single circle is covered with a narrow green filter (Agfa Repro-filter No. 54L) while the small circular perforations are covered with a narrow red filter (Agfa Repro-filter No. 45L). This effects a color correction. The transmission maxima of the narrow filters coincide with the sensitization maxima of the masking film, with the result that the best possible separation of the colors and of the mask is achieved.

Light-sensitive masking film

A transparent support of cellulose acetate having a thickness of $200\mu$ is coated with a light-sensitive silver halide gelatin emulsion described in FIAT Final Report No. 360, page 28 which before casting has been diluted with a 7% aqueous gelatin solution in a proportion of 1:1. The light-sensitive layer having a thickness of $6.5\mu$ was panchromatically sensitized by the addition of suitable sensitizers. A protecting layer was applied onto the light-sensitive emulsion layer.

Processing

The above photographic material is exposed as described hereinbefore and processed and developed in a common black-and-white developer until a gradation of 0.50 is obtained. The developer has the following composition:

| | |
|---|---|
| Water ml | 1000 |
| p-Methylaminophenol g | 7.5 |
| Hydroquinone g | 3.5 |
| Potassium bromide g | 3 |
| Sodium carbonate (anhydrous) g | 30 |
| Sodium sulfite (anhydrous) g | 40 |

The developer time using a diluted developer (1 part developer and 1 part water) is 3 minutes.

The developed photographic material is rinsed, fixed in an acid fixing bath, rinsed again and dried.

The resulting masking image is combined in register with the multicolor original, whereby the black-and-white masking image is arranged on the back of the transparent original.

The desired color corrected color separation records are prepared according to common practice from the multicolored reflection original through the black-and-white masking image using for the exposure for each separation record suitable color separation filters.

What is claimed is:

1. In a process of producing a masking image for color correction of multicolor images which consist of yellow, magenta and cyan partial images by:
    (a) exposing to a multicolor image a black and white light-sensitive photographic material comprising a light-sensitive silver halide emulsion layer that is sensitive to light of at least two thirds of the visible spectrum, wherein the multicolor photographic image is illuminated with white light and wherein the light-sensitive photographic material is exposed through a filter which transmits light of at least two thirds of the visible spectrum to which the light-sensitive silver halide emulsion layer is sensitive,
    (b) developing the exposed light-sensitive material to produce a silver masking image therein that is negative with respect to the multicolor photographic image and
    (c) fixing and drying the developed material, the improvement according to which the exposure is effected through a diffusing diaphragm having at least 2 perforations, which are covered by at least 2 differently colored filters.

2. A process as defined in claim 1, wherein the perforations of the multicolor diffusing diaphragm are arranged in central symmetrical form.

3. A process as defined in claim 1, wherein the perforations of the multicolor diffusing diaphragm are arranged in the form of a regular grid.

4. A process as defined in claim 1, wherein the perforations of the multicolor diffusing diaphragms have green and red filters and wherein the light-sensitive silver halide emulsion is panchromatically sensitized.

5. In a process of producing a masking image for color correction of a multicolor image by exposing a black and white light-sensitive photographic material to said multi color image through at least two differently colored color correction filters for predetermined times, the improvement according to which the exposure is effected through a diffusing diaphragm that has diffusing perforations covered with differently colored color correction filters, the relative areas of the respective colors corresponding to the ratio of said predetermined times.

6. A process as defined in claim 5 wherein the diffusing diaphragm is located on or very close to the objective.

References Cited

UNITED STATES PATENTS

| 1,439,035 | 12/1922 | Stuart | 96—118 |
| 2,213,382 | 9/1940 | Busse | 96—118 |
| 3,229,569 | 1/1966 | Frost et al. | 96—23 |

OTHER REFERENCES

Walter Nernst: Theoretical Chemistry, 1923 McMillan; London, fifth edition; L. W. Codd, M.A. Translator.

NORMAN G. TORCHIN, Primary Examiner

ALFONSO T. SURO PICO, Assistant Examiner

U.S. Cl. X.R.

88—111; 96—44